US011243567B2

(12) United States Patent
McLaughlin

(10) Patent No.: US 11,243,567 B2
(45) Date of Patent: Feb. 8, 2022

(54) DEFORMABLE ELECTRONIC DEVICE AND METHODS AND SYSTEMS FOR RECONFIGURING PRESENTATION DATA AND ACTUATION ELEMENTS

(71) Applicant: Motorola Mobility LLC, Chicago, IL (US)

(72) Inventor: Michael McLaughlin, San Jose, CA (US)

(73) Assignee: Motorola Mobility LLC, Chicago, IL (US)

( * ) Notice: Subject to any disclaimer, the term of this patent is extended or adjusted under 35 U.S.C. 154(b) by 520 days.

(21) Appl. No.: 15/209,519

(22) Filed: Jul. 13, 2016

(65) Prior Publication Data

US 2018/0018753 A1 Jan. 18, 2018

(51) Int. Cl.
*G06F 1/16* (2006.01)
*G06F 3/14* (2006.01)
(Continued)

(52) U.S. Cl.
CPC .......... *G06F 1/1626* (2013.01); *G06F 1/1677* (2013.01); *G06F 1/3293* (2013.01);
(Continued)

(58) Field of Classification Search
CPC . G06T 3/40; G06T 3/60; G06F 1/1626; G06F 1/1677; G06F 3/044; G06F 3/04845; G06F 3/1446; G06F 3/0488; G06F 2203/04102; G06F 2203/041; G06F 2203/04803; G06F 3/0487; G06F 1/3293; G09G 2380/02; G09G 5/14; G09G 2340/14; G09G 2354/00; Y02D 10/00
(Continued)

(56) References Cited

U.S. PATENT DOCUMENTS 10,063,677 B2 8/2018 Cavallaro et al.
2002/0138767 A1 9/2002 Hamid
(Continued)

FOREIGN PATENT DOCUMENTS

CN 104850769 8/2015
EP 2500898 9/2012
(Continued)

OTHER PUBLICATIONS

Hauber, Jorg , "European Search Report", European Application No. EP 17179859; dated Oct. 9, 2017.
(Continued)

*Primary Examiner* — Jennifer Mehmood
*Assistant Examiner* — Kim Thanh T Tran
(74) *Attorney, Agent, or Firm* — Philip H. Burrus, IV

(57) ABSTRACT

An electronic device includes a housing, which may be deformable or may include hinges to allow a display, which is flexible, to be deform by bending or other operations. One or more flex sensors detect when the electronic device is deformed at a deformation portion. One or more processors, which include an application processor, reconfigure a presentation of content along the flexible display in response to detecting deformation at the deformation portion, where the reconfiguring includes a content aspect ratio transition from a first predefined aspect ratio to a second predefined aspect ratio.

20 Claims, 8 Drawing Sheets

(51) Int. Cl.
  *G06F 3/0487* (2013.01)
  *G09G 5/14* (2006.01)
  *G06F 1/3293* (2019.01)

(52) U.S. Cl.
  CPC .......... *G06F 3/0487* (2013.01); *G06F 3/1446* (2013.01); *G09G 5/14* (2013.01); *G06F 2203/04803* (2013.01); *G09G 2340/14* (2013.01); *G09G 2354/00* (2013.01); *G09G 2380/02* (2013.01); *Y02D 10/00* (2018.01)

(58) Field of Classification Search
  USPC ........................................................ 345/661
  See application file for complete search history.

(56) References Cited

U.S. PATENT DOCUMENTS

| | | |
|---|---|---|
| 2003/0172283 A1 | 9/2003 | O'Hara |
| 2007/0057935 A1* | 3/2007 | Takagi ................... G06F 3/011 345/211 |
| 2007/0171921 A1* | 7/2007 | Wookey ................ G06F 3/1415 370/401 |
| 2008/0238610 A1 | 10/2008 | Rosenberg |
| 2009/0240940 A1 | 9/2009 | Shoemake et al. |
| 2011/0095974 A1 | 4/2011 | Moriwaki |
| 2011/0312311 A1 | 12/2011 | Abifaker et al. |
| 2013/0076663 A1 | 3/2013 | Sirpal et al. |
| 2014/0028435 A1 | 1/2014 | Brockway, III |
| 2014/0098095 A1* | 4/2014 | Lee ......................... G06F 3/041 345/420 |
| 2014/0118317 A1* | 5/2014 | Song ..................... G06F 1/1652 345/204 |
| 2014/0160337 A1* | 6/2014 | Van Den Herik . H04N 5/23293 348/333.1 |
| 2014/0306985 A1 | 10/2014 | Jeong et al. |
| 2014/0320274 A1 | 10/2014 | De Schepper et al. |
| 2015/0022515 A1 | 1/2015 | Ikeda et al. |
| 2015/0042674 A1 | 2/2015 | Lin |
| 2015/0081559 A1 | 3/2015 | Dua |
| 2015/0146387 A1 | 5/2015 | Lee |
| 2015/0177789 A1* | 6/2015 | Jinbo ..................... G06F 1/1652 313/511 |
| 2015/0186636 A1 | 7/2015 | Tharappel |
| 2015/0227223 A1* | 8/2015 | Kang ..................... G06F 3/0487 345/173 |
| 2015/0286813 A1 | 10/2015 | Jakobsson |
| 2015/0301672 A1 | 10/2015 | Kim et al. |
| 2015/0338916 A1 | 11/2015 | Priyantha et al. |
| 2015/0348453 A1* | 12/2015 | Jin ......................... G09F 9/301 345/173 |
| 2015/0358315 A1 | 12/2015 | Cronin |
| 2016/0021168 A1 | 1/2016 | Chaudhri et al. |
| 2016/0057139 A1 | 2/2016 | McDonough |
| 2016/0093240 A1 | 3/2016 | Aurongzeb et al. |
| 2016/0267732 A1 | 9/2016 | Agrfioti et al. |
| 2017/0017313 A1 | 1/2017 | Rakshit |
| 2017/0047044 A1 | 2/2017 | Zheng et al. |
| 2017/0177096 A1* | 6/2017 | Cheong ................. G06F 3/0346 |
| 2017/0185289 A1* | 6/2017 | Kim ....................... G06F 1/1652 |
| 2017/0345365 A1* | 11/2017 | Li .......................... G09G 3/3225 |

FOREIGN PATENT DOCUMENTS

| | | |
|---|---|---|
| EP | 2793214 | 10/2014 |
| WO | 2015016160 | 2/2015 |
| WO | 2015/187504 | 12/2015 |
| WO | 2015/195011 | 12/2015 |

OTHER PUBLICATIONS

Morris, Euros , "GB Search Report and Written Opinion", GB Application No. GB1710801.0; dated Dec. 20, 2017; Search Date Dec. 18, 2017.

Saddington, Aaron , "GB Search and Written Opinion", GB Application No. GB1710820.0; dated Dec. 19, 2017.

Tran, Kim Thanh Thi , "Non-Final Office Action", U.S. Appl. No. 15/209,527, filed Jul. 13, 2016; dated Dec. 12, 2017.

Zanglein, Ulrike , "PCT Search Report", PCT/US2017/041435; International Filing Date Jul. 11, 2017; dated Sep. 21, 2017.

Gee, Jason Kai Yin , "NonFinal OA", U.S. Appl. No. 15/209,524, filed Jul. 13, 2016; dated Jul. 6, 2018.

Kanaan, Simon , "NonFinal OA", U.S. Appl. No. 15/209,514, filed Jul. 13, 2016; dated Apr. 2, 2018.

Rashid, Harunur , "NonFinal OA", U.S. Appl. No. 15/209,530, filed Jul. 13, 2016; dated Feb. 22, 2018.

Tran, Kim Thanh Thi , "Final OA", U.S. Appl. No. 15/209,527, filed Jul. 13, 2016; dated Jul. 12, 2018.

Gee, Jason , "Final Office Action", U.S. Appl. No. 15/209,534, filed Jul. 13, 2016; dated Dec. 13, 2018.

Kanaan, Simon , "NonFinal Office Action", U.S. Appl. No. 15/209,514, filed Jul. 13, 2016; dated Dec. 13, 2018.

Rashid, Harunur , "Final Office Action", U.S. Appl. No. 15/209,530, filed Jul. 13, 2016; dated Aug. 23, 2018.

Gee, Jason Kai Yin , "NonFinal Office Action", U.S. Appl. No. 15/209,524, filed Jul. 13, 2016; dated Oct. 1, 2019.

Kanaan, Simon , "Notice of Allowance", U.S. Appl. No. 15/209,514; filed Jul. 13, 2016; dated May 20, 2019.

Kanaan, Simon P. , "NonFinal OA", U.S. Appl. No. 16/434,077; filed Jun. 6, 2019; dated Jun. 11, 2020.

Kanaan, Simon P , "Notice of Allowance", U.S. Appl. No. 16/434,077; filed Jun. 6, 2019; dated Jul. 23, 2020.

Morris, Euros , "Great Britain Search Report", GB Application No. 1710801.0; dated Dec. 17, 2018.

Morris, Euros , "Office Action", GB1710801.0; dated Feb. 5, 2020.

Rashid, Harunur , "Notice of Allowance", U.S. Appl. No. 15/209,530; filed Jul. 13, 2016; dated Jan. 25, 2019.

Steckert, Markus , "Office Action", German Application No. 102017115316.0; dated Mar. 2, 2020.

Tran, Kim Thanh Thi , "Non-Final Office Action", U.S. Appl. No. 17/113,526, filed Dec. 7, 2020; dated Sep. 28, 2021.

* cited by examiner

DEFORMABLE ELECTRONIC DEVICE AND METHODS AND SYSTEMS FOR RECONFIGURING PRESENTATION DATA AND ACTUATION ELEMENTS

BACKGROUND

Technical Field

This disclosure relates generally to electronic devices and corresponding methods, and more particularly to physically deformable electronic devices.

Background Art

Mobile electronic communication devices, such as smartphones, are used by billions of people. These users employ mobile communication devices for many different purposes including, but not limited to, voice communications and data communications for text messaging, Internet browsing, commerce such as banking, and social networking.

As the technology of these devices has advanced, so too has their feature set. For example, not too long ago all electronic devices had physical keypads. Today touch sensitive displays are more frequently seen as user interface devices. Similarly, it used to be that the only way to deliver user input to a device was with touch, either through a keypad or touch sensitive display. Today some devices are equipped with voice recognition that allows a user to speak commands to a device instead of typing them.

These smaller, yet more powerful, devices are being used for many different applications in many different environments. It would be advantageous to have improved operating modes of an electronic device to adapt performance to a given environment, condition, or application.

Figure 1:
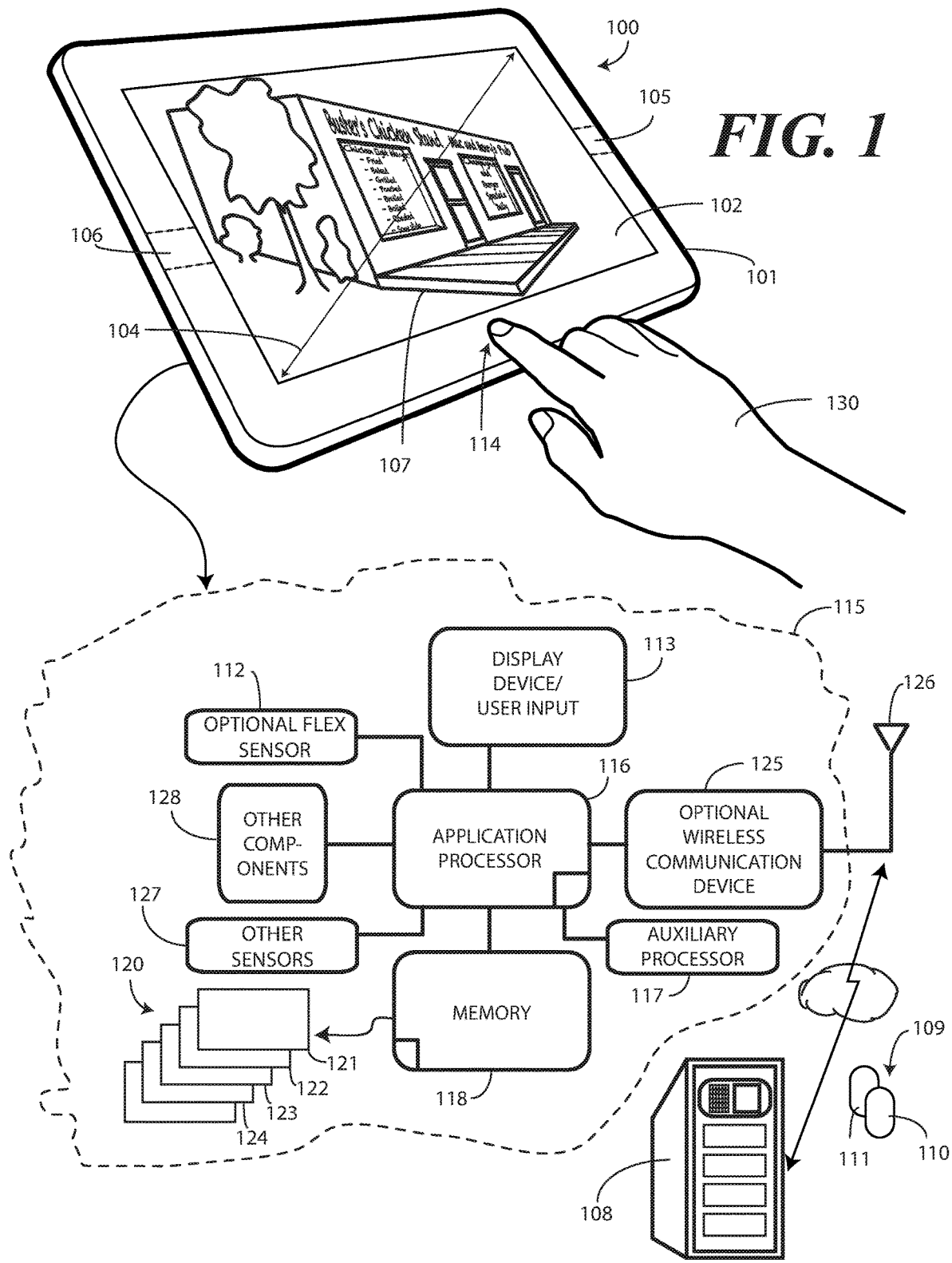
FIG. 1 illustrates a schematic block diagram of one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to, in response to a bending operation occurring to deform a flexible display of the electronic device, reconfiguring a presentation of content along the flexible display with a content aspect ratio transition from a first aspect ratio to a second aspect ratio, while repurposing complementary portions of the flexible display. Process descriptions or blocks in a flow chart can be modules, segments, or portions of code that implement specific logical functions of a machine or steps in a process, or alternatively that transition specific hardware components into different states or modes of operation. Alternate implementations are included, and it will be clear that functions may be executed out of order from that shown or discussed, including substantially concurrently or in reverse order, depending on the functionality involved.

It will be appreciated that embodiments of the disclosure described herein may be comprised of one or more conventional processors and unique stored program instructions that control the one or more processors to implement, in conjunction with certain non-processor circuits, some, most, or all of the functions of transitioning aspect ratios and repurposing portions of the flexible display for secondary content or secondary functions as described herein. The non-processor circuits may include, but are not limited to, imaging devices, microphones, loudspeakers, acoustic amplifiers, digital to analog converters, signal drivers, clock circuits, power source circuits, and user input devices. As such, these functions may be interpreted as steps of a method to perform control operations and repurposing functions when a flexible display is deformed by one or more bends. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device having a flexible display, improve the functioning of the electronic device itself by facilitating the presentation of imagery at different aspect ratios and improving the overall user experience to overcome problems specifically arising in the realm of the technology associated with electronic device user interaction.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. Also, reference designators shown herein in parenthesis indicate components shown in a figure other than the one in discussion. For example, talking about a device (10) while discussing figure A would refer to an element, 10, shown in figure other than figure A.

Embodiments of the disclosure employ a system that includes an electronic device with a flexible display that can be physically deformed by one or more bends or folds. The flexible display is supported by a device housing.

In one embodiment, the housing of the electronic device is deformable. Internal and external components can be flexible as well. For instance, flexible batteries and flexible circuit boards can support various components within the electronic device. Touch sensors and substrates can be flexible as well. Remaining or other components disposed within the electronic device, such as one or more processors, other sensors, and other devices, are arranged such that a user can flex, bend, and/or fold the electronic device by executing a bending operation that physically deforms one or more of the housing or display into a deformed geometry.

In another embodiment, the housing may include rigid components that are linked together by one or more hinges. Such hinges can provide a solution offering needed system flexibility by providing support and movement for the flexible display during bending or folding operations. A multi-link hinge with support beams disposed beneath the flexible display, for example, can support the flexible display while allowing portions of the housing to pivot about an axis of the hinge.

In one or more embodiments, when the flexible display is deformed by one or more bends at a deformation portion, one or more processors operable with the flexible display are configured to reconfigure a presentation of content along the flexible display by causing a content aspect ratio transition from a first aspect ratio to a second aspect ratio. In addition to reconfiguring the presentation of content, in one or more embodiments the one or more processors also repurpose a portion of the flexible display that is complementary to the portion configured with the second aspect ratio for the presentation of secondary content. The secondary content can be various types of contents, including static content such as a picture, content associated with secondary operating environments, or other content. Advantageously, in one or more embodiments the presentation of secondary content requires less—or no—operating power from the one or more processors, thereby allowing processing capabilities to be used for the presentation of content at the second aspect ratio while still providing a pleasant aesthetic in the repurposed portions of the flexible display.

In one embodiment, the first aspect ratio is a 4:3 aspect ratio, while the second aspect ratio comprises a 16:9 aspect ratio. In one embodiment, the flexible display has a diagonal dimension of between seven and eight inches. Where this is the case, an electronic device operating in an undeformed physical configuration can function as a palm-top computer or tablet computer. However, the same electronic device can be folded or otherwise deformed into a deformed configuration to function as a smartphone or other more compact device.

Embodiments of the disclosure contemplate that most content suitable for presentation on screens of electronic devices are formatted for one of two predefined aspect ratios: 4:3 and 16:9. While there are other aspect ratios in use, these two aspect ratios tend to be standards about which content providers configure content. The 4:3 aspect ratio is a legacy aspect ratio that dates itself to early cathode ray tubes associated with television sets. By contrast, the 16:9 ratio is sometimes referred to as a "widescreen" aspect ratio. Embodiments of the disclosure also contemplate that the 4:3 aspect ratio is well suited for use with tablet computers, as a tablet computer having a 4:3 aspect ratio has dimensions resembling a notepad or sheet of paper. By contrast, smartphones, gaming devices, and other handheld devices are well suited for the 16:9 aspect ratio, as this aspect ratio lends itself to an electronic device having dimensions that readily fit within a user's hand.

Embodiments of the disclosure further contemplate that, when employed in a bendable electronic device configured in accordance with one or more embodiments of the disclosure, that configuring presentation of content in response to folding operations is problematic when attempting to present content in conventional aspect ratios. Illustrating by example, for a single electronic device to provide a 4:3 aspect ratio when unfolded and a 16:9 ratio when folded in half, its dimensions become unwieldy. A device with an eight-inch diagonal (4.79"×6.38") can provide a 4:3 aspect ratio when unfolded and a 16:9 aspect ratio when folded (assuming a fold width of one inch). However, when folded, a display of this configuration feels too wide and further may be too large for many users' hands. When the folded size is reduced, to something having about a 2.36 inch width, when both folded and unfolded the device has a smaller dimension than desired. Embodiments of the disclosure also contemplate that when a bendable electronic device configured in accordance with one or more embodiments of the disclosure is unfolded to function a tablet, and the flexible display has a diagonal dimension suitable for tablet operation such as nine inches, when folded in half the display may provide a greater surface area than many users require or can reach.

Advantageously, embodiments of the disclosure provide a solution to all of these issues while providing ancillary benefits of extended battery life and a reduction in processor operational loads. In one or more embodiments, an electronic device includes a flexible display and one or more flex sensors to detect a deflection of the flexible display. When this occurs, one or more processors operable with the flex sensors can divide a portion of the flexible display disposed to one side of the deflection into a first subportion and a second subportion that is complementary to the first subportion. The one or more processors may then present content in the first subportion with a predefined aspect ratio, while repurposing the second subportion for presentation of secondary content. The presentation of secondary content can be such that operational loading of the one or more processors can be reduced, as will be described in more detail below.

Accordingly, in one embodiment an electronic device configured in accordance with embodiments of the disclosure has a flexible display with a diagonal dimension of about nine inches. When in an undeformed physical condition, one or more processors can present content on the flexible display at a first aspect ratio, i.e, 4:3, as the display has a width of about 5.4 inches and a height of about 7.2 inches.

However, when the electronic device is deformed by one or more bends, in one embodiment the one or more processors reconfigure a presentation of content along the flexible display in response to detecting deformation at the deformation portion. In one embodiment, the one or more processors transition the content aspect ratio from the first aspect ratio to a second aspect ratio, e.g. a 16:9 aspect ratio. For example, the one or more processors may present the content at the 16:9 aspect ratio along a 2.4×4.24 inch subportion of the flexible display disposed to one side of the bend.

At the same time, in one or more embodiments the one or more processors also repurpose a complementary portion of the screen, which would be about a 2.4 by 3.0 inch square, for the presentation of secondary content. The one or more processors may present, for example, a user defined photo in the repurposed area. Since the presentation of a static photograph requires less processing power than does the presentation of other content, overall power consumption and processor workload are reduced. In some embodiments, the presentation of the secondary content can be handed off to secondary operating environments or auxiliary processors, thereby further reducing primary processor power consumption and workload while providing the user with an aesthetically pleasing display presentation. Other advantages will be obvious to those of ordinary skill in the art having the benefit of this disclosure.

The deformability of embodiments of the disclosure not only offer unique ways of viewing content through the transition of aspect ratios and repurposing of certain display portions, but can additionally make the device easier to use. For example, by being able to stand an otherwise thin electronic device on its side, the display can be easily viewable despite the fact that the electronic device is out of the user's hand. Bending the device into folded and multi-fold shapes allows the device to transform into a "self-standing" device, which can free a user's hands for other activities.

In one or more embodiments, different deformed geometries can launch different modes of operation. Illustrating by example, if the electronic device is bent with a single fold, when placed on a table the electronic device can resemble a card folded into a "tent fold." Where this occurs, one or more processors of the electronic device can partition the display into two parts, with each part being on a different side of the "tent." Assuming an aspect ratio transition from 4:3 when unfolded to 16:9 when folded, content can be presented on either sides of the tent in the 16:9 aspect ratio with complementary portions repurposed for secondary content. In other embodiments, a number of bends can be used to partition the display. Where this is the case, the one or more processors may be able to present four images in a predefined aspect ratio to provide two different content offerings to two different users. More permutations are completely possible and will be described in the paragraphs below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device, and is shown operating as a tablet computer. This illustrative electronic device 100 includes a display 102, which may optionally be touch-sensitive. In one embodiment where the display 102 is touch-sensitive, the display 102 can serve as a primary user interface of the electronic device 100. Users can deliver user input to the display 102 of such an embodiment by delivering touch input from a finger, stylus, or other objects disposed proximately with the display.

In one embodiment, when operating as a tablet computer, the display 102 has a diagonal dimension 104 of between about seven and ten inches, inclusive. In one illustrative embodiment, the display has a diagonal dimension 104 of about nine inches. As will be shown in more detail below, such a diagonal dimension 104 is advantageous in that it allows the electronic device 100 to operate as a tablet computer when undeformed and as a smartphone that fits comfortably in a user's hand when deformed by a central bend at a deformation portion. However, other diagonal dimensions will be obvious to those of ordinary skill in the art having the benefit of this disclosure.

In one embodiment, the display 102 is configured as an organic light emitting diode (OLED) display fabricated on a flexible plastic substrate. However, it should be noted that other types of displays would be obvious to those of ordinary skill in the art having the benefit of this disclosure. In one or more embodiments, an OLED is constructed on flexible plastic substrates can allow the display 102 to become flexible in one or more embodiments with various bending radii. For example, some embodiments allow bending radii of between thirty and six hundred millimeters to provide a bendable display. Other substrates allow bending radii of around five millimeters to provide a display that is foldable through active bending. Other displays can be configured to accommodate both bends and folds. In one or more embodiments the display 102 may be formed from multiple layers of flexible material such as flexible sheets of polymer or other materials.

The explanatory electronic device 100 of FIG. 1 also includes a housing 101 supporting the display 102. In one or more embodiments, the housing 101 is flexible. In one embodiment, the housing 101 may be manufactured from a malleable, bendable, or physically deformable material such as a flexible thermoplastic, flexible composite material, flexible fiber material, flexible metal, organic or inorganic textile or polymer material, or other materials. In other embodiments, the housing 101 could also be a combination of rigid segments connected by hinges 105,106 or flexible materials. Still other constructs will be obvious to those of ordinary skill in the art having the benefit of this disclosure.

Where the housing 101 is a deformable housing, it can be manufactured from a single flexible housing member or from multiple flexible housing members. In this illustrative embodiment, a user interface component 114, which may be a button or touch sensitive surface, can also be disposed along the housing 101 to facilitate control of the electronic device 100. Other features can be added, and can be located on the front of the housing 101, sides of the housing 101, or the rear of the housing 101.

A block diagram schematic 115 of the electronic device 100 is also shown in FIG. 1. In one embodiment, the electronic device 100 includes one or more processors. In one or more embodiments, the one or more processors include an application processor 116. The electronic device 100 can also optionally include an auxiliary processor 117. One or both of the application processor 116 or the auxiliary processor 117 can include one or more processors. One or both of the application processor 116 or the auxiliary processor 117 can be a microprocessor, a group of processing components, one or more Application Specific Integrated Circuits (ASICs), programmable logic, or other type of processing device. The application processor 116 and the auxiliary processor 117 can be operable with the various components of the electronic device 100. Each of the application processor 116 and the auxiliary processor 117 can be configured to process and execute executable software code to perform the various functions of the electronic device 100. A storage device, such as memory 118, can optionally store the executable software code used by the application processor 116 or the auxiliary processor 117 during operation.

As will be described in more detail below, in one or more embodiments when the electronic device 100 is deformed by a bend at a deflection portion, the one or more processors divide a portion of the display 102 disposed to one side of the deflection into a first subportion and a second subportion that is complementary to the first subportion. The application processor 116 can then present content in the first subportion with a predefined aspect ratio while repurposing the second subportion for presentation of secondary content. While inclusion of the auxiliary processor 117 is not mandatory, in one or more embodiments its incorporation into the electronic device 100 can be advantageous because the presentation of the secondary content can be handled by the auxiliary processor 117, thereby relieving the application processor 116 to be dedicated to the presentation of the content at the predefined aspect ratio.

For example, in one embodiment, the application processor 116 can be responsible for performing the primary functions of the electronic device 100. For example, in one embodiment the application processor 116 comprises one or more circuits operable to present presentation information, such as images, text, and video, on the display 102 in accordance with a predefined aspect ratio. The executable software code used by the application processor 116 can be configured as one or more modules 120 that are operable with the application processor 116. Such modules 120 can store instructions, control algorithms, and so forth.

In one embodiment, the application processor 116 is responsible for running the operating system environment 121. The operating system environment 121 can include a kernel, one or more drivers 122, and an application service layer 123, and an application layer 124. The operating system environment 121 can be configured as executable code operating on one or more processors or control circuits of the electronic device 100.

In one or more embodiments, the application processor 116 is responsible for managing the applications of the electronic device 100. In one or more embodiments, the application processor 116 is also responsible for launching, monitoring and killing the various applications and the various application service modules. The applications of the application layer 124 can be configured as clients of the application service layer 123 to communicate with services through application program interfaces (APIs), messages, events, or other inter-process communication interfaces.

By contrast, where the auxiliary processor 117 is included, it can be tasked with executing non-secure or non-application operations. For example, the auxiliary processor 117 can execute functions to present secondary content on repurposed portions of the display 102. The auxiliary processor 117 can also execute other non-application functions, such as input/output functions, actuation of user feedback devices, and so forth.

In one or more embodiments, as it tasked with many more operations to manage, the application processor 116 consumes more power than does the auxiliary processor 117 on an average basis when operating normally under an average load. For example, in ordinary operation the application processor 116 may consume on the order of tens of Watts or more when running applications, communicating voice or other data, or presenting primary content in accordance with a predefined aspect ratio By contrast, the auxiliary processor 117 may consume less power. For example, an auxiliary processor 117 may consume on the order of less than a Watt in its normal operation. Accordingly, in one or more embodiments the auxiliary processor 117 will consume less power than the application processor 116 when both the auxiliary processor 117 and the application processor 116 are operational. In some situations, the application processor 116 can consume an order or magnitude or more power than the auxiliary processor 117. Advantageously, in one or more embodiments the presentation of secondary content on repurposed portions of the display 102 can be delegated to the auxiliary processor 117, thereby reducing power consumption and workload requirements of the application processor 116. This solution works to conserve overall power usage in the electronic device 100 by utilizing the auxiliary processor 117 for the presentation of secondary content while leaving the presentation of content at predefined aspect ratios to the application processor 116.

Embodiments of the disclosure can provide other advantageous modes operation when repurposing portions of the display 102 for the presentation of secondary content as well. Illustrating by example, independent of the optional inclusion of the auxiliary processor 117, in one or more embodiments, one or both of the application processor 116 and/or auxiliary processor 117 can run multiple operating environments. The use of multiple operating environments allows the presentation of secondary content to be handled by a secondary operating environment, thereby freeing resources of the primary operating environment.

In one embodiment, the electronic device 100 is configured for operation in a dual-operating system hybrid environment. A first operating system environment handles primary operations of the electronic device 100, including the presentation of content at a predefined aspect ratio. However, in certain use cases such as the presentation of secondary content, the application processor 116 and/or auxiliary processor 117 can run a second operating system environment having dedicated, secondary capabilities.

In one embodiment, the application processor 116 and/or auxiliary processor 117 has access to two simultaneous operating system environments. The first operating system environment is a standard operating environment, where normal operations such as the presentation of content at predefined aspect ratios occur. The second operating system environment, which optionally is operable only on the auxiliary processor 117, is responsible for performing secondary operations such as the presentation of secondary content in repurposed areas of the display 102. When executing the second operating system environment, the application processor 116 can also run the first operating system environment. Advantageously, in one or more embodiments the presentation of secondary content on repurposed portions of the display 102 can be delegated to second operating system environment, thereby reducing power consumption and workload requirements of the first operating system environment. This solution also works to conserve overall power usage in the electronic device 100. The use of multiple operating system embodiments can occur when only the application processor 116 is included in the electronic device 100. By contrast, both the application processor 116 and the auxiliary processor 117 can operate in a single operating system environment. Of course, a combination of the two can be used as described above as well.

In this illustrative embodiment, the electronic device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 125 may also utilize wireless technology for communication, such as, but are not limited to, peer-to-peer or ad hoc communications such as HomeRF, Bluetooth and IEEE 802.11 (a, b, g or n), and other forms of wireless communication such as infrared technology. The communication circuit 125 can include wireless communication circuitry, one of a receiver, a transmitter, or transceiver, and one or more antennas 126.

As shown in FIG. 1, the application processor 116 is presenting content 107 on the display 102 at a predefined aspect ratio. The content 107 of this illustration is a graphical image. In this embodiment, the display 102 has dimensions of about 5.4 inches by 7.2 inches, so the predefined aspect ratio employing the full display is a 4:3 aspect ratio.

In one or more embodiments, content 107 is retrieved, using the communication circuit 125, from one or more remote servers 108. In one or more embodiments, this content 107 is retrieved in the form of "app packages" 109. These app packages 109 are retrieved, in many cases, with the content 107 packaged at a predefined aspect ratio that corresponds to a particular type of electronic device. For instance, if the electronic device 100 of FIG. 1 were only to operate in the tablet computer mode shown, a first app package 110 with the content 107 formatted at a first aspect ratio, e.g., 4:3, would be retrieved. However, as noted above, in one or more embodiments the electronic device 100 can be deformed with the content aspect ratio transitioning from a first aspect ratio to a second aspect ratio. Accordingly, in one or more embodiments, to further save reconfiguration time of one or both of the application processor 116 and/or the auxiliary processor 117, both a first app package 110 with the content 107 formatted at a first aspect ratio, e.g., 4:3, and a second app package 111 with the content 107 formatted at a second aspect ratio, e.g., 16:9, are retrieved from the remote server 108. This allows the application processor 116 and/or auxiliary processor 117 to quickly transition the content aspect ratio between the first aspect ratio and the second aspect ratio without having to execute transition algorithms in real time.

Figure 5:
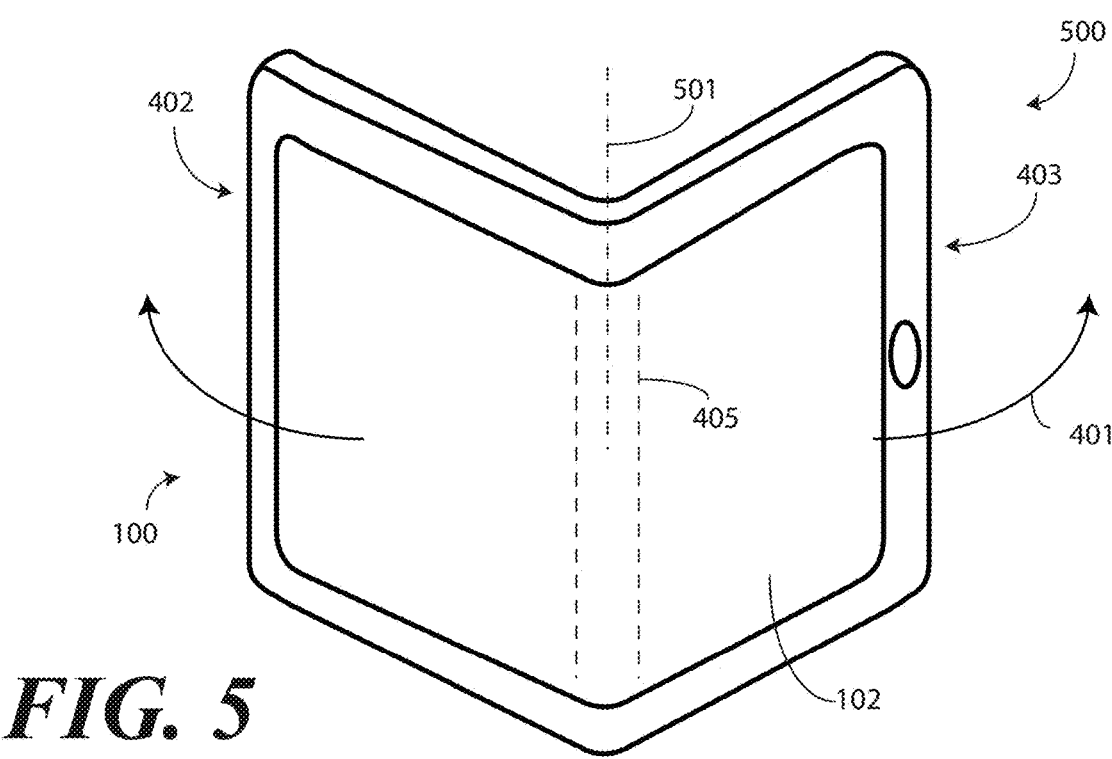
FIG. 5 illustrates one explanatory electronic device having a flexible display that is deformed by one or more bends in accordance with one or more embodiments of the disclosure.
Figure 6:
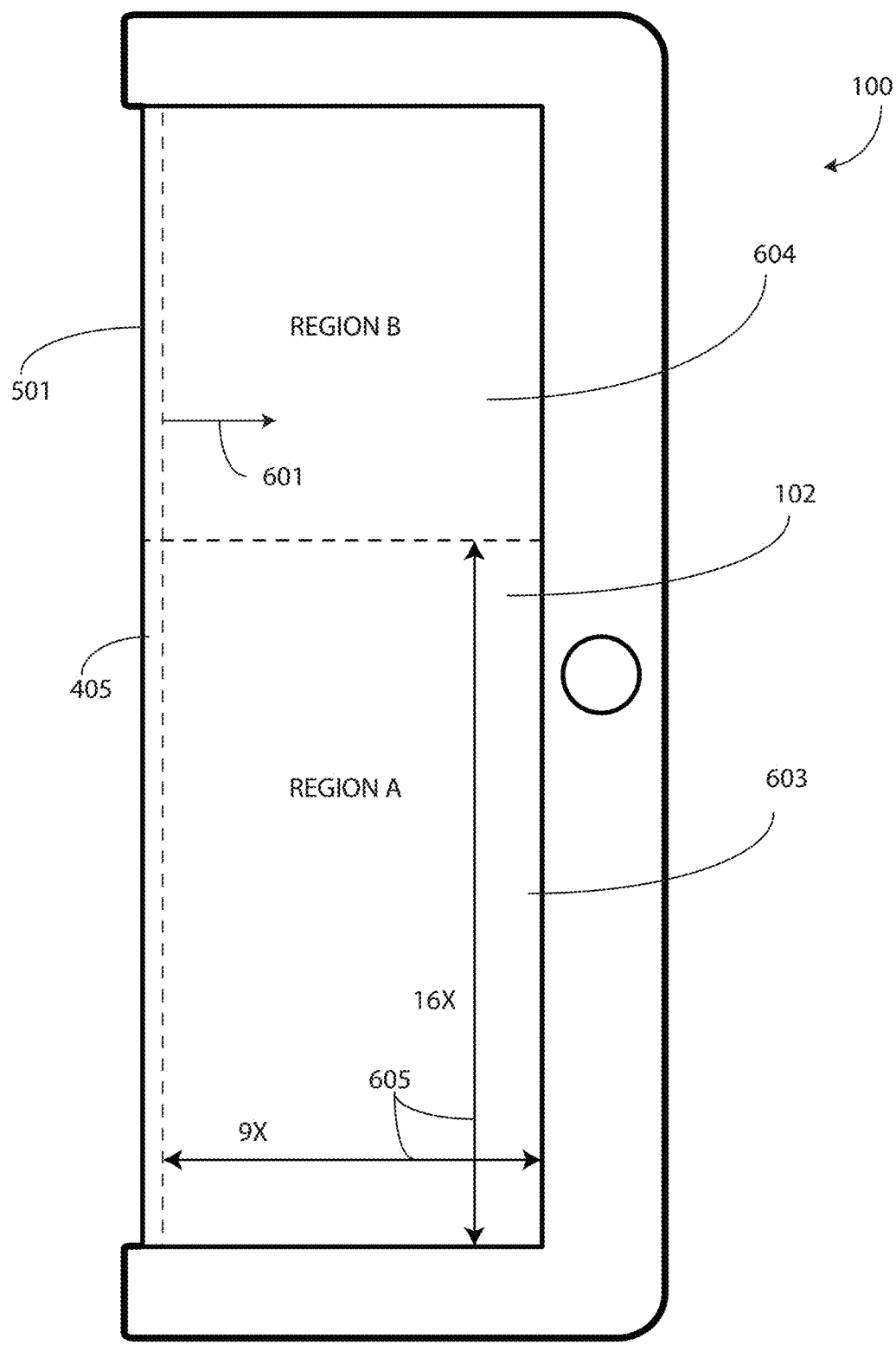
FIG. 6 illustrates one explanatory electronic device in a deformed physical configuration and having a second aspect ratio and a repurposed display portion, complementary to the display portion having the second aspect ratio, in accordance with one or more embodiments of the disclosure.

In one embodiment, the electronic device 100 includes one or more flex sensors 112, supported by the housing 101 and operable with the application processor 116, to detect a bending operation deforming one or more of the housing 101 or the display 102 into a deformed geometry, such as that shown in FIGS. 5-6. The inclusion of flex sensors 112 is optional, and in some embodiment flex sensors 112 will not be included. As one or more functions of the electronic device 100 occur when the display 102 is deformed by one or more bends, where flex sensors 112 are not included, the user can alert the application processor 116 to the fact that the one or more bends are present through the user interface 113 or by other techniques.

In one embodiment, the flex sensors 112 each comprise passive resistive devices manufactured from a material with an impedance that changes when the material is bent, deformed, or flexed. By detecting changes in the impedance as a function of resistance, the application processor 116 can use the one or more flex sensors 112 to detect bending or flexing. In one or more embodiments, each flex sensor 112 comprises a bi-directional flex sensor that can detect flexing or bending in two directions. In one embodiment, the one or more flex sensors 112 have an impedance that increases in an amount that is proportional with the amount it is deformed or bent.

In one embodiment, each flex sensor 112 is manufactured from a series of layers combined together in a stacked structure. In one embodiment, at least one layer is conductive, and is manufactured from a metal foil such as copper. A resistive material provides another layer. These layers can be adhesively coupled together in one or more embodiments. The resistive material can be manufactured from a variety of partially conductive materials, including paper-based materials, plastic-based materials, metallic materials, and textile-based materials. In one embodiment, a thermoplastic such as polyethylene can be impregnated with carbon or metal so as to be partially conductive, while at the same time being flexible.

In one embodiment, the resistive layer is sandwiched between two conductive layers.

Electrical current flows into one conductive layer, through the resistive layer, and out of the other conductive layer. As the flex sensor 112 bends, the impedance of the resistive layer changes, thereby altering the flow of current for a given voltage. The application processor 116 can detect this change to determine an amount of bending. Taps can be added along each flex sensor 112 to determine other information, including the number of folds, the degree of each fold, the location of the folds, the direction of the folds, and so forth. The flex sensor 112 can further be driven by time-varying signals to increase the amount of information obtained from the flex sensor 112 as well. While a multi-layered device as a flex sensor 112 is one configuration suitable for detecting a bending operation occurring to deform the electronic device 100 and a geometry of the electronic device 100 after the bending operation, others can be used as well. For example, in another embodiment the proximity sensors can be used to detect how far a first end of the electronic device 100 is from a second end of the electronic device 100. Still other types of flex sensors 112 will be obvious to those of ordinary skill in the art having the benefit of this disclosure.

In one embodiment, the application processor 116 may generate commands or execute control operations based on information received from the various sensors, including the one or more flex sensors 112, the user interface 113, or the other sensors 127. The application processor 116 may also generate commands or execute control operations based upon information received from a combination of the one or more flex sensors 112, the user interface 113, or the other sensors 127. Alternatively, the application processor 116 can generate commands or execute control operations based upon information received from the one or more flex sensors 112 or the user interface 113 alone. Moreover, the application processor 116 may process the received information alone or in combination with other data, such as the information stored in the memory 118.

The other sensors 127 may include a microphone, an earpiece speaker, a loudspeaker, key selection sensors, a touch pad sensor, a touch screen sensor, a capacitive touch sensor, and one or more switches. Touch sensors may used to indicate whether any of the user actuation targets present on the display 102 are being actuated. Alternatively, touch sensors disposed in the housing 101 can be used to determine whether the electronic device 100 is being touched at side edges or major faces of the electronic device 100 are being performed by a user 130. The touch sensors can include surface and/or housing capacitive sensors in one embodiment. The other sensors 127 can also include video sensors (such as a camera).

The other sensors 127 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion. In one embodiment the motion detectors are also operable to detect movement, and direction of movement, of the electronic device 100 by a user 130.

Other components 128 operable with the application processor 116 can include output components such as video outputs, audio outputs, and/or mechanical outputs. Examples of output components include audio outputs, an earpiece speaker, haptic devices, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Figure 2:
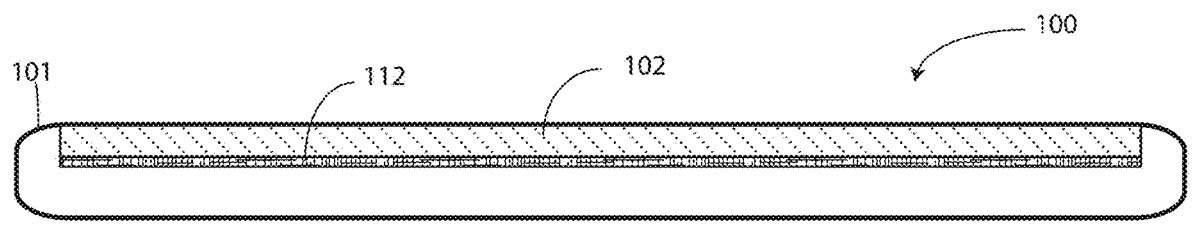
FIG. 2 illustrates a sectional view of one explanatory electronic device in accordance with one or more embodiments of the disclosure.

Now that the various hardware components have been described, attention will be turned to methods, systems, and use cases in accordance with one or more embodiments of the disclosure. Beginning with FIG. 2, illustrated therein is a sectional view of the electronic device 100. Shown with the electronic device 100 are the display 102 and the housing 101, each of which is flexible in this embodiment. Also shown is the flex sensor 112, which spans at least two axes (along the width of the page and into the page as viewed in FIG. 2) of the electronic device 100.

Figure 3:
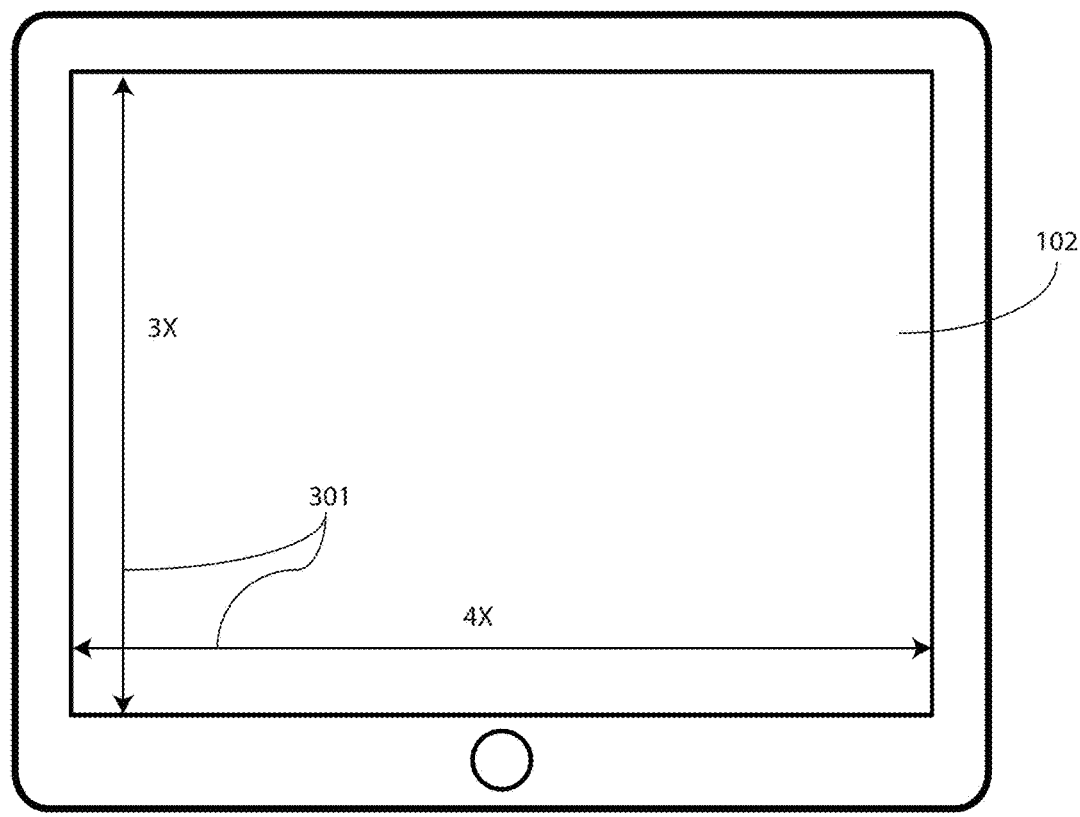
FIG. 3 illustrates one explanatory electronic device in an undeformed physical configuration and having a first aspect ratio in accordance with one or more embodiments of the disclosure.

As shown in FIG. 3, when undeformed by any deflection, bend, or other deformation, in one embodiment the application processor (116) of the electronic device 100 is operable to present content (107) at a first predefined aspect ratio 301. In this illustrative embodiment, the display 102 has dimensions of about 5.4 inches by 7.2 inches, so the first predefined aspect ratio 301 utilizing the full dimensions of the display 102 is a 4:3 aspect ratio.

Figure 4:
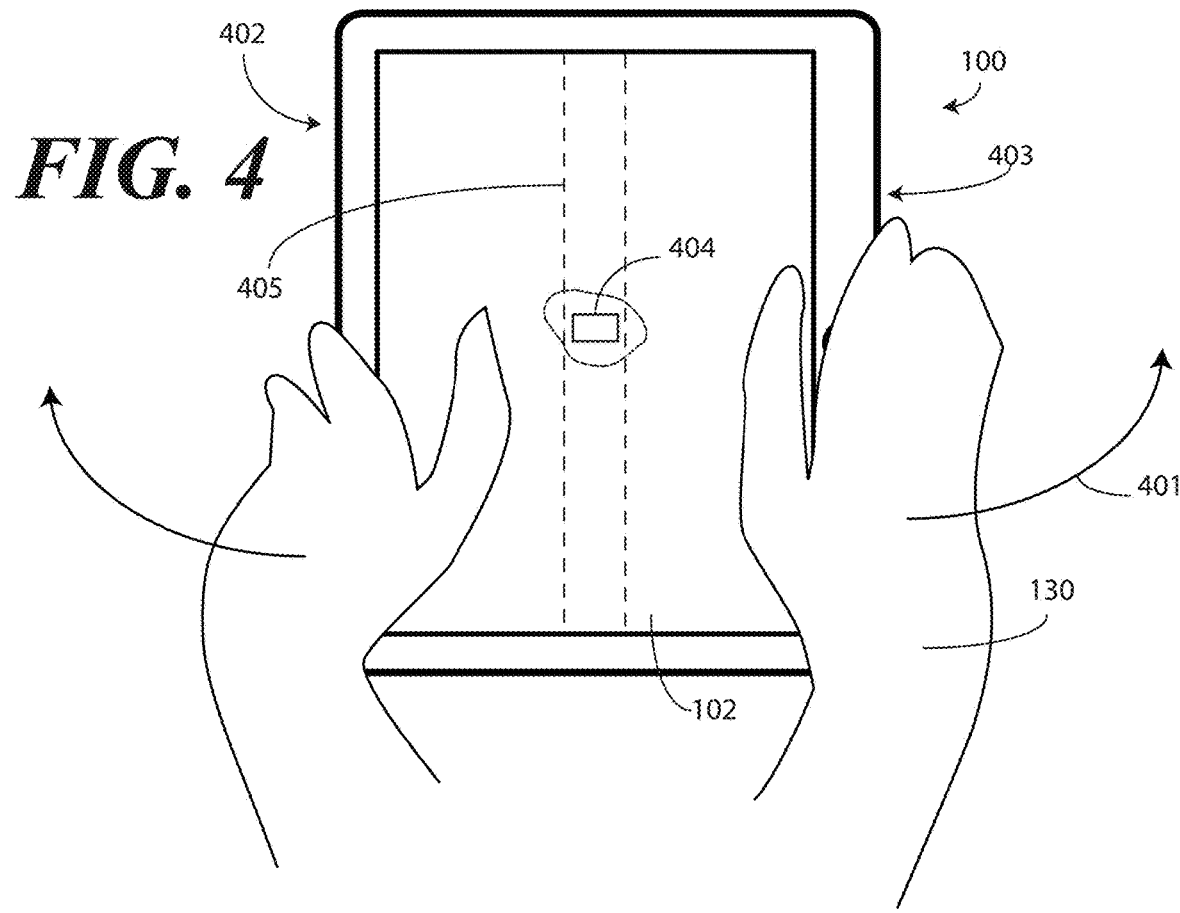
FIG. 4 illustrates a user manipulating one explanatory electronic device in accordance with one or more embodiments of the disclosure to execute a bending operation to deform the electronic device.

Turning now to FIG. 4, a user 130 is executing a bending operation 401 upon the electronic device 100 to impart deformation at a deformation portion 405 of the electronic device 100. In this illustration, the user 130 is applying force (into the page) at the first side 402 and a second side 403 of the electronic device 100 to bend both the housing 101, which is deformable in this embodiment, and the display 102 at the deformation portion 405. Internal components disposed along flexible substrates are allowed to bend as well along the deformation portion 405. This method of deforming the housing 101 and display 102 allows the user 130 to simply and quickly bend the electronic device 100 into a desired deformed physical configuration or shape.

In other embodiments, rather than relying upon the manual application of force, the electronic device can include a mechanical actuator 404, operable with the application processor (116), to deform the display 102 by one or more bends. For example, a motor or other mechanical actuator can be operable with structural components to bend the electronic device 100 to predetermined angles and physical configurations in one or more embodiments. The use of a mechanical actuator 404 allows a precise bend angle or predefined deformed physical configurations to be repeatedly achieved without the user 130 having to make adjustments. However, in other embodiments the mechanical actuator 404 will be omitted to reduce component cost.

Regardless of whether the bending operation 401 is a manual one or is instead one performed by a mechanical actuator 404, it results in the display 102 being deformed by one or more bends. One result 500 of the bending operation 401 is shown in FIG. 5. In this illustrative embodiment, the electronic device 100 is deformed by a single bend 501 at the deformation portion 405. However, in other embodiments, the one or more bends can comprise a plurality of bends. Other deformed configurations will be obvious to those of ordinary skill in the art having the benefit of this disclosure.

In one embodiment, the application processor (116) of the electronic device 100 is operable to detect that a bending operation 401 is occurring by detecting a change in an impedance of the one or more flex sensors (112). The application processor (116) can detect this bending operation 401 in other ways as well. For example, the touch sensors can detect touch and pressure from the user (130). Alternatively, the proximity sensors can detect the first side 402 and the second side 403 of the electronic device 100 getting closer together. Force sensors can detect an amount of force that the user (130) is applying to the housing 101 as well. The user (130) can input information indicating that the electronic device 100 has been bent using the display 102 or other user interface (113). Other techniques for detecting that the bending operation (401) has occurred will be obvious to those of ordinary skill in the art having the benefit of this disclosure.

Several advantages offered by the "bendability" of embodiments of the disclosure are illustrated in FIG. 5. For instance, in one or more embodiments the application processor (116) of the electronic device 100 is operable to, when the display 102 is deformed by one or more bends, present a first image on a first portion of the display 102 disposed to a first side of the bend 501, while presenting a second image on a second portion of the display 102 disposed to a second side of the bend 501. This allows a user (130) to see two different images at once. Additionally, where the electronic device 100 is configured in the physical configuration shown in FIG. 5, which resembles a card folded into a "tent fold," the electronic device 100 can stand on its side or ends on a flat surface such as a table. This configuration can make the display 102 easier for the user (130) to view since they do not have to hold the electronic device 100 in their hands.

In one or more embodiments, the application processor (116) is operable to detect the number of folds in the electronic device 100 resulting from the bending operation (401). In one embodiment, after determining the number of folds, the application processor (116) can partition the display 102 of the electronic device 100 as another function of the one or more folds. Since there is a single bend 501 here, in this embodiment the display 102 has been partitioned into a first portion and a second portion, with each portion being disposed on opposite sides of the "tent."

In one or more embodiments, the bending operation 401 can continue from the physical configuration of FIG. 5 until the electronic device 100 is fully folded as shown in FIG. 6. Embodiments of the disclosure contemplate that a user (130) may hold the electronic device 100 in one hand when in this deformed physical configuration. For example, the user (130) may use the electronic device 100 as a smartphone in the folded configuration of FIG. 6, while using the electronic device 100 as a tablet computer in the unfolded configuration of FIG. 3. Accordingly, in one embodiment, the application processor (116) presents content only to one side 601 of the deformation portion 405 in response to detecting the deformation. In this illustrative embodiment, the one side 601 is to the right of the deformation portion 405. However, if the electronic device 100 were flipped over, as detected by the accelerometer, gyroscope, or Other sensors (127), the one side 601 would be to the left of the deformation portion 405.

In one or more embodiments, the application processor (116), in response to detecting the deformation, divides a portion 602 of the display 102 disposed to the one side 601 of the deformation portion 405 into a first subportion 603 and a second subportion 604. In this embodiment, the first subportion 603 is complementary to the second subportion 604, with that term taking the plain, ordinary, English mathematical meaning where the second subportion 604 does not overlap the first subportion 603 and fills all of the portion 602 of the display 102 to the one side 601 of the deformation portion 405 not occupied by the first subportion 603.

In one embodiment, the application processor (116) is further operable to, in response to detecting the deformation, reconfigure a presentation of content along the display 102, where the reconfiguring comprises a content aspect ratio transition from a first predefined aspect ratio (301) to a second predefined aspect ratio 605. In this illustrative embodiment, the dimensions of the first subportion 603 are about 2.4 inches by 4.24 inches. Accordingly, in this illustrative embodiment the second predefined aspect ratio 605 is a 16:9 aspect ratio. Thus, in one embodiment, when the electronic device 100 is deformed by a bend 501 or other deformation in the deformation portion 405, the application processor (116) reconfigures the presentation of content from, for example, the 4:3 aspect ratio of FIG. 3 to the 16:9 aspect ratio of FIG. 6. The application processor (116) can perform other transformations as well, such as rotating the content from portrait to landscape, changing operational modes, and so forth. Still others will be obvious to those of ordinary skill in the art having the benefit of this disclosure.

In one or more embodiments, the application processor (116) then repurposes the second subportion 604 of the display 102 by configuring the second subportion 604 of the display 102 differently from the first subportion 603. In one or more embodiments, for example, secondary content, different from the content presented in the first subportion 603, can be presented in the second subportion 604.

The secondary content can take a variety of forms. Recall from above that in one or more embodiments content (107) that is presented in the first subportion 603 is retrieved from one or more remote servers (108). By contrast, in one embodiment the secondary content presented in the second subportion 604 comprises locally stored content. Accordingly, pictures, images, videos, graphics, or other indicia can be stored in a local memory (118) and presented in the second subportion 604 while content retrieved from remote servers (108) can be presented in the first subportion 603 in one embodiment.

In another embodiment, the content presented in the second subportion 604 comprises static content, while the content presented in the first subportion 603 at the second predefined aspect ratio 605 is dynamic content. Illustrating by example, dynamic content can include content having user actuation targets, graphics, or other objects that a user (130) interacts with by touching, moving, or otherwise manipulating the user actuation targets. One example of dynamic content is a home screen that presents a number of applications along the home screen, each allowing a user (130) to launch a given application by touching its corresponding user actuation target. By contrast, a photograph may be considered static content because, while a user (130) may be able to scale or alter the photograph, the user (130) is unable to actuate secondary operations such as launching an underlying application by interacting with the photograph. Locally stored content and static content are just two examples of content suitable for presentation in the second subportion 604. Others will be obvious to those of ordinary skill in the art having the benefit of this disclosure. For example, the content could also include side shows, animates photos, video content, and other forms of content.

As noted above, in one or more embodiments, such as where an auxiliary processor (117) is included, the application processor (116) can present content in the first subportion 603 with the second predefined aspect ratio 605. The secondary content can then be handled by the auxiliary processor (117), thereby relieving the application processor 116 to be dedicated to the presentation of the content at the predefined aspect ratio. Advantageously, in one or more embodiments the presentation of secondary content on repurposed portions of the display 102, i.e., the second subportion 604 in this example, can be delegated to the auxiliary processor (117). This solution works to conserve overall power usage in the electronic device 100 by utilizing the auxiliary processor (117) for the presentation of secondary content in the second subportion 604 while leaving the presentation of content at the second predefined aspect ratio 605 to the application processor (116).

In another embodiment, such as where the application processor (116) and/or auxiliary processor (117) run multiple operating environments, presentation of secondary content in the second subportion 604 can be handled by a secondary operating environment, thereby freeing resources of the primary operating environment. Advantageously, in one or more embodiments the presentation of secondary content on repurposed portions of the display 102, i.e., the second subportion 604 in this example, can be delegated to the auxiliary processor (117), can be delegated to second operating system environment, thereby reducing power consumption and workload requirements of the first operating system environment.

Figure 7:
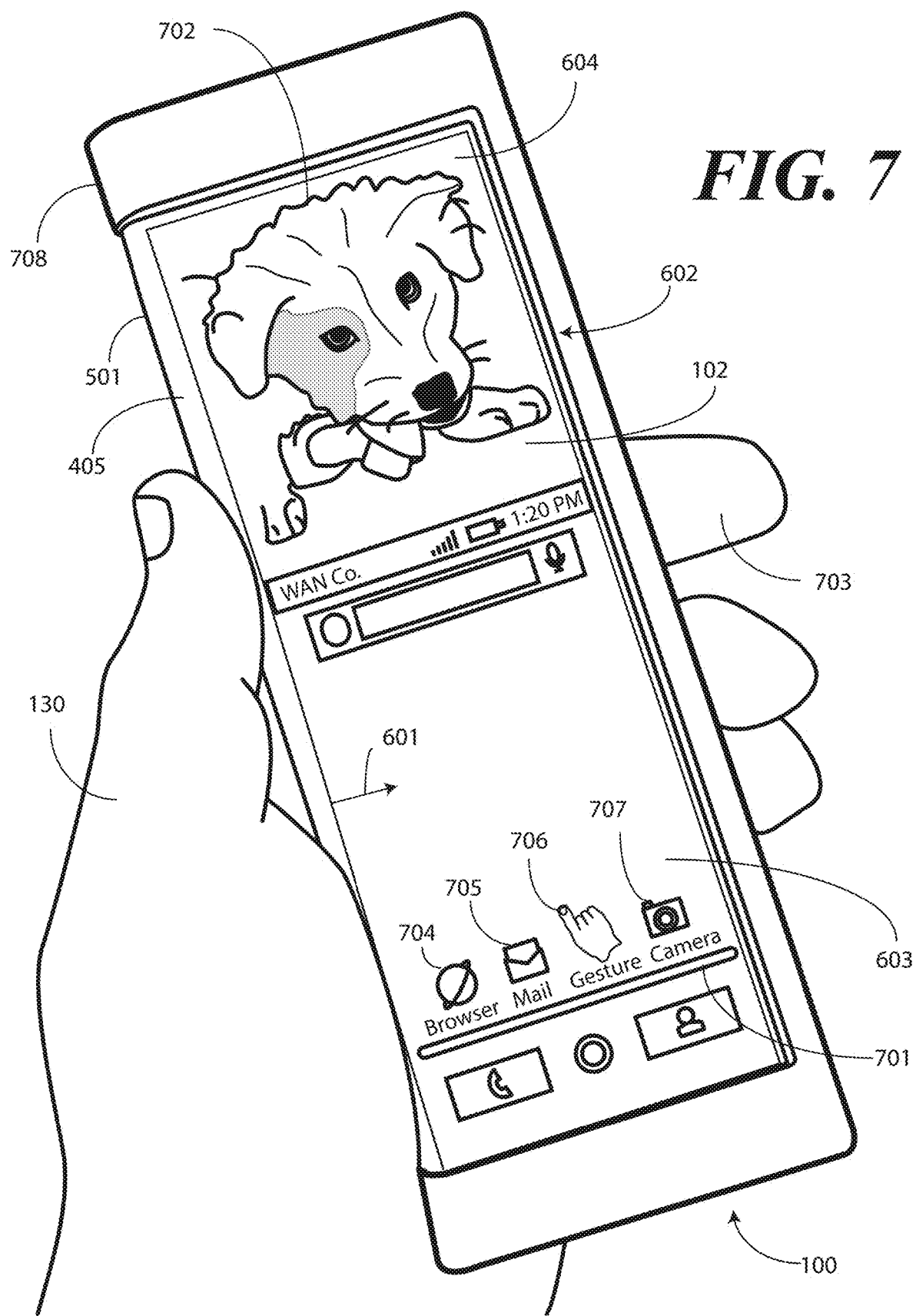
FIG. 7 illustrates one explanatory electronic device in a deformed physical configuration with one or more processors dividing a flexible display and presenting content in a first subportion with a predefined aspect ratio while repurposing a second subportion for presentation of secondary content in accordance with one or more embodiments of the disclosure.

Turning now to FIG. 7, illustrated therein is the electronic device 100, in the folded configuration, being used by the user 130. The flexible display 102 has been deformed by a bend 501 along a deformation portion 405. One or more flex sensors (112) have detected this deflection of the flexible display 102. Optionally, the one or more flex sensors (112) additionally determine a location 708 along the deformable housing 101 defining the deformation portion 405, which allows the application processor (116) to adjust the presentation of the content as a function of the location 708 as well.

In this illustration, an application processor (116), operable with the one or more flex sensors (112), divides a portion 602 of the flexible display disposed to one side 601 of the deflection defined by the bend 501 into a first subportion 603 and a second subportion 604 that is complementary to the first subportion 603. Additionally, the application processor (116) presents content 701 in the first subportion 603 with a predefined aspect ratio, which in this case is a 16:9 aspect ratio. The application processor (116) repurposes the second subportion 604 for presentation of secondary content 702. The secondary content 702 of this illustration is user defined, locally stored, static content, namely, a picture of the user's dog, Buster. As noted above, in one embodiment the application processor (116) can be responsible for the presentation of the secondary content 702. However, in other embodiments presentation of the secondary content 702 can be delegated to an auxiliary processor (117), a second operating system environment, or combinations thereof to conserve power and operational resources of the electronic device 100.

Several advantages offered by embodiments of the disclosure are apparent in FIG. 7. First, embodiments of the disclosure contemplate that when the electronic device 100 is in the folded configuration, the user's fingers 703 may not readily reach all portions of the display 102. Accordingly, user actuation targets 704,705,706,707 can be presented as primary content in the first subportion 603 of the display 102 at the second predefined aspect ratio where they are within easy reach of the user's fingers 703. At the same time, repurposing the second subportion 604 of the display allows the user 130 to look at his dog, Buster, while using the electronic device 100 as a smartphone.

Figure 8:
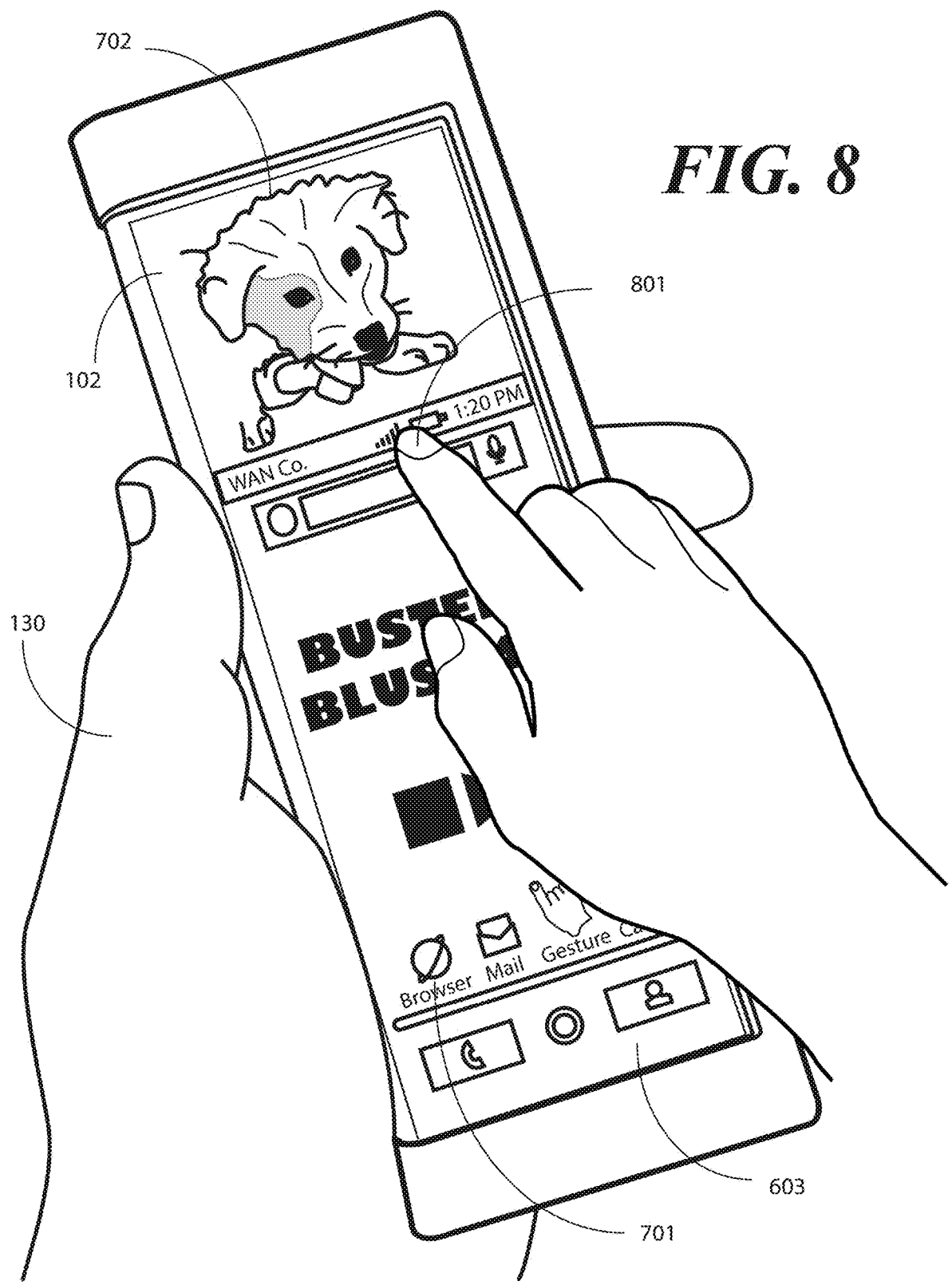
FIG. 8 illustrates one explanatory electronic device in a deformed physical configuration with a user adjusting subportions of a flexible display from a predefined aspect ratio in accordance with one or more embodiments of the disclosure.

Should this not be the case, i.e., should the user prefer other dimensions for the primary content 701, embodiments of the disclosure allow for such adjustment. Turning now to FIG. 8, the user 130 is delivering user input 801 to the display 102 to adjust the dimensions of the first subportion 603 of the display 102 by sliding a boundary of the primary content 701 up. Accordingly, when this occurs, the application processor (116) adjusts the presentation of the content as a function of the user input. In this illustration, a major dimension of the primary content 701 gets longer, while a major dimension of the secondary content 702 gets shorter. Had the user input been in the opposite direction, the opposite adjustment could have been made.

Figure 9:
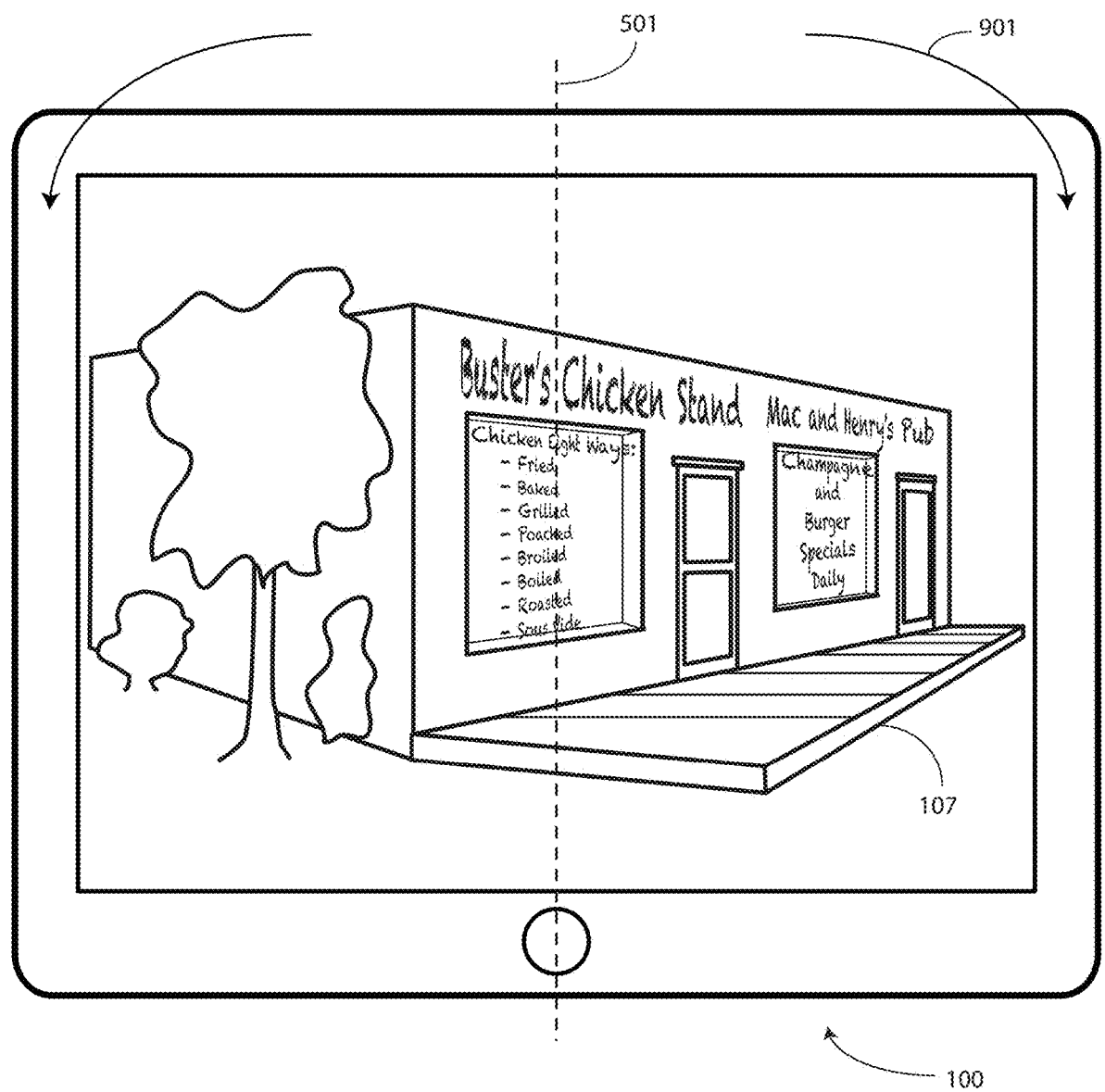
FIG. 9 illustrates one explanatory device in accordance with one or more embodiments of the disclosure after transitioning from a deformed physical configuration to an undeformed physical configuration, and after presentation of content has transitioned from a second aspect ratio to a first aspect ratio in accordance with one or more embodiments of the disclosure.

Turning now to FIG. 9, the electronic device 100 has been unfolded and transitioned to the extended, substantially planar physical configuration associated with the tablet computer mode. Where this occurs, the one or more flex sensors (112) detect removal of the deflection defined by the bend 501. In response to the removal of the deflection, the application processor (116) of the electronic device 100 terminates presentation of the secondary content (702) and transitions the predefined aspect ratio of the primary content 107 back to the first predefined aspect ratio (301), which in this case is the 4:3 aspect ratio.

Two points of note: when causing the predefined aspect ratio transition between the first predefined aspect ratio (301) and the second predefined aspect ratio (605), the application processor (116) can do this in multiple ways. In one embodiment, the application processor (116) can modify the content locally by manipulating graphical characteristics of the content to transition the aspect ratio. This is computationally intensive, but is possible. In another embodiment, which is more efficient, the application processor (116) can retrieve both a first app package (110) with the content formatted at a first aspect ratio and a second app package (111) with the content formatted at a second aspect ratio. This allows the application processor (116) to quickly transition the content aspect ratio between the first aspect ratio and the second aspect ratio without having to execute transition algorithms in real time.

Second, in addition to changing the aspect ratio, the application processor (116) can change the operational mode as well. For example, in the transition from FIG. 8 to FIG. 9, the one or more flex sensors (112) detect removal 901 of the deflection. In response, the application processor (116) of the electronic device 100 terminates presentation of the secondary content (702) and transitions not only the predefined aspect ratio back to the first predefined aspect ratio (301), but changes the operating mode as well. The primary content (701) of FIG. 8 includes user actuation targets (704,705,706,707) because the primary content (701) was a user control interface when the electronic device 100 was operating in a smartphone mode. By contrast, the primary content (107) of FIG. 9 is a picture of Mac and Henry's Pub because the operating mode has changed from a smartphone mode to an image viewer mode. Other modes suitable for transition between open and folded physical configurations will be obvious to those of ordinary skill in the art having the benefit of this disclosure.

Figure 10:
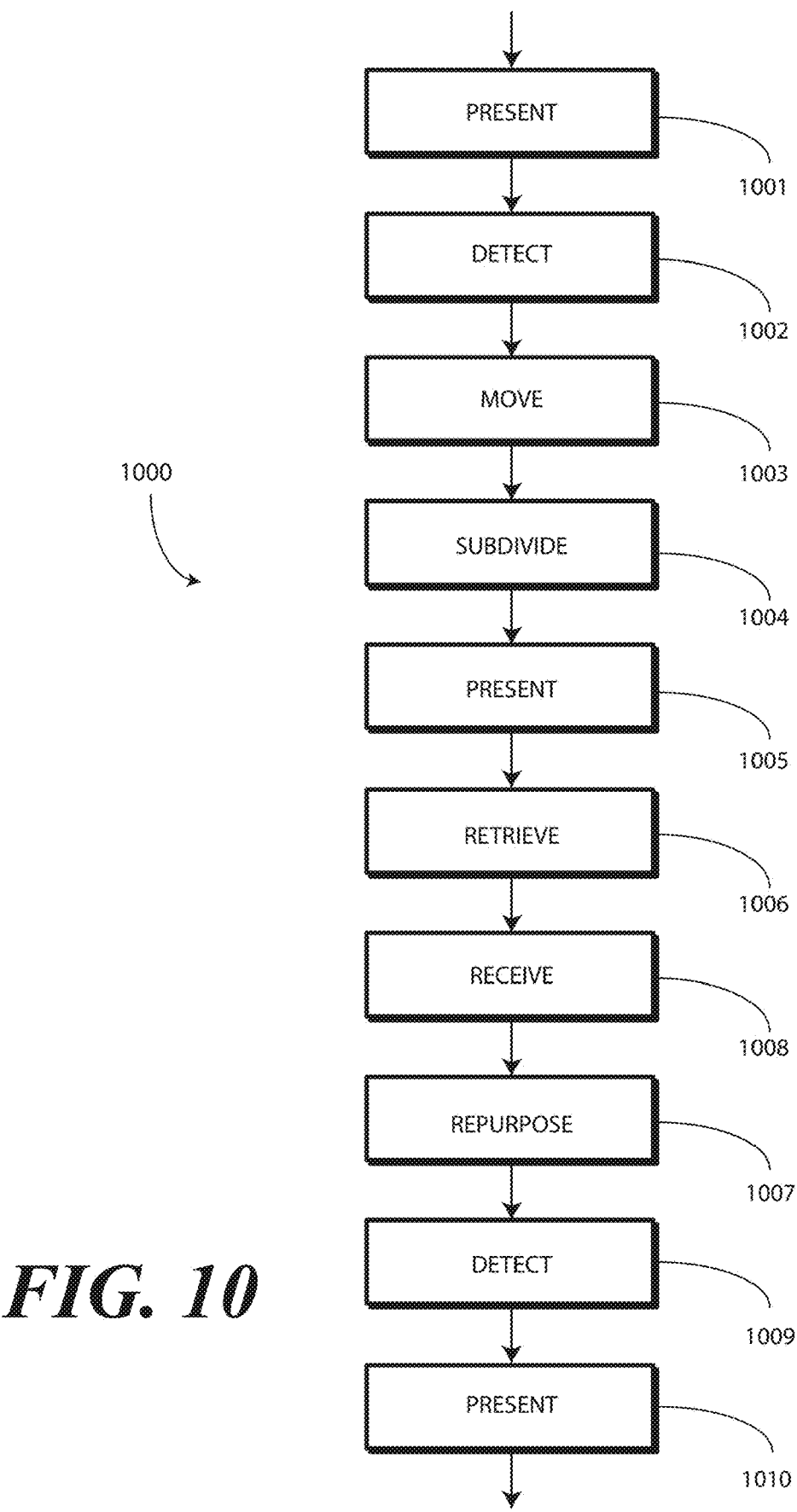
FIG. 10 illustrates one explanatory method in accordance with one or more embodiments of the disclosure.

Turning now to FIG. 10, illustrated therein is one explanatory method 1000 in accordance with one or more embodiments of the disclosure. At step 1001, the method 1000 includes presenting content, with one or more processors, on a flexible display at a first aspect ratio. At step 1002, the method 1000 includes detecting, with one or more flex sensors, deformation of the flexible display by a bend.

At step 1003, the method 1000 includes moving presentation of the content to a portion of the flexible display disposed to one side of the bend. At step 1004, the method 1000 includes subdividing the portion into a first subportion and a second subportion that is complementary to the first subportion.

At step 1005, the method 1000 includes presenting the content in the first subportion of the flexible display at the a second aspect ratio. In one embodiment, step 1005 further comprises rotating the content by ninety degrees. At optional step 1006, the method 1000 optionally comprises retrieving, with a wireless communication circuit from a remote server, a content package for the content at the second aspect ratio to save local processing resources.

At step 1007, the method 1000 includes repurposing the second subportion of the flexible display for presentation of secondary content. In one embodiment, the secondary content is user defined content. Accordingly, at optional step 1008, the method 1000 includes receiving user input selecting the secondary content.

At step 1009, the method 1000 includes detecting, with the one or more flex sensors, removal of the bend. At step 1010, the method 1000 includes again presenting the content on the flexible display at the first aspect ratio.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. For example, while bending was the primary mode of changing a geometry of an electronic device, other techniques, including squeezing, stretching, pulling, and shaking could also be used.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising;
a deformable housing;
a flexible display supported by the deformable housing;
one or more flex sensors supported by the deformable housing, the one or more flex sensors detecting when the electronic device is deformed at a deformation portion; and
one or more processors operable with the flexible display and the one or more flex sensors, the one or more processors reconfiguring a presentation of content along the flexible display in response to detecting deformation at the deformation portion, the reconfiguring comprising a content aspect ratio transition from a first aspect ratio to a second aspect ratio;
the one or more processors further dividing a portion of the flexible display disposed to the one side of the deformation portion into a first subportion and a second subportion that is complementary to the first subportion, the one or more processors presenting the content in the first subportion at the second aspect ratio and presenting secondary content, different from the content, in the second subportion;
the one or more processors terminating presentation of the secondary content upon the one or more flex sensors detecting removal of deformation at the deformation portion.

2. The electronic device of claim 1, the one or more processors presenting the content only to one side of the deformation portion in response to detecting the deformation.

3. The electronic device of claim 2, the first aspect ratio comprising a 4:3 aspect ratio, the second aspect ratio comprising a 16:9 aspect ratio.

4. The electronic device of claim 1, the one or more processors further configuring the second subportion differently from the first subportion.

5. The electronic device of claim 1, the secondary content comprising locally stored content.

6. The electronic device of claim 5, the locally stored content comprising an image.

7. The electronic device of claim 1, the secondary content comprising static content.

8. The electronic device of claim 1, the one or more flex sensors determining a location along the deformable housing defining the deformation portion, the one or more processors adjusting the presentation of the content as a function of the location.

9. The electronic device of claim 1, further comprising a user interface, the user interface receiving a user input, the one or more processors adjusting the presentation of the content as a function of the user input.

10. An electronic device, comprising:
a flexible display;
one or more flex sensors, the one or more flex sensors detecting a deflection of the flexible display; and
one or more processors operable with the one or more flex sensors, the one or more processors dividing a portion of the flexible display disposed to one side of the deflection into a first subportion and a second subportion that is complementary to the first subportion, presenting content in the first subportion with a predefined aspect ratio, and repurposing the second subportion for presentation of secondary content, thereby reducing an operational loading of the one or more processors.

11. The electronic device of claim 10, the one or more flex sensors further detecting removal of the deflection, the one or more processors terminating presentation of the secondary content in response to detection of the removal of the deflection and transitioning the predefined aspect ratio to a second predefined aspect ratio.

12. The electronic device of claim 11, the predefined aspect ratio comprising a 16:9 aspect ratio, the second predefined aspect ratio comprising a 4:3 aspect ratio.

13. The electronic device of claim 10, the flexible display defined by a diagonal dimension of between seven and ten inches, inclusive.

14. A method, comprising:
presenting content, with one or more processors, on a flexible display at a first aspect ratio;
detecting, with one or more flex sensors, deformation of the flexible display by a bend;
moving presentation of the content to a portion of the flexible display disposed to one side of the bend;
subdividing the portion into a first subportion and a second subportion that is complementary to the first subportion;
presenting the content in the first subportion of the flexible display at the a second aspect ratio; and
repurposing the second subportion of the flexible display for presentation of secondary content.

15. The method of claim 14, further comprising receiving user input selecting the secondary content.

16. The method of claim 14, further comprising retrieving, with a wireless communication circuit from a remote server, a content package for the content at the second aspect ratio.

17. The method of claim 14, further comprising:
   detecting, with the one or more flex sensors, removal of the bend; and
   again presenting the content on the flexible display at the first aspect ratio.

18. The method of claim 14, further comprising rotating the content by ninety degrees.

19. The electronic device of claim 1, the one or more processors comprising an application processor and an auxiliary processor, wherein:
   the auxiliary processor consumes less power than the application processor;
   the application processor presents the content in the first subportion at the second aspect ratio; and
   the auxiliary processor presents the secondary content in the second subportion.

20. The electronic device of claim 1, the one or more processors further changing an operational mode of the electronic device in response to the electronic device is deformed at a deformation portion.

* * * * *